Sheet 1, 22 Sheets.
9682X
J. A. Wilkinson.
Making Weavers' Reeds.
Patented May 24, 1836.
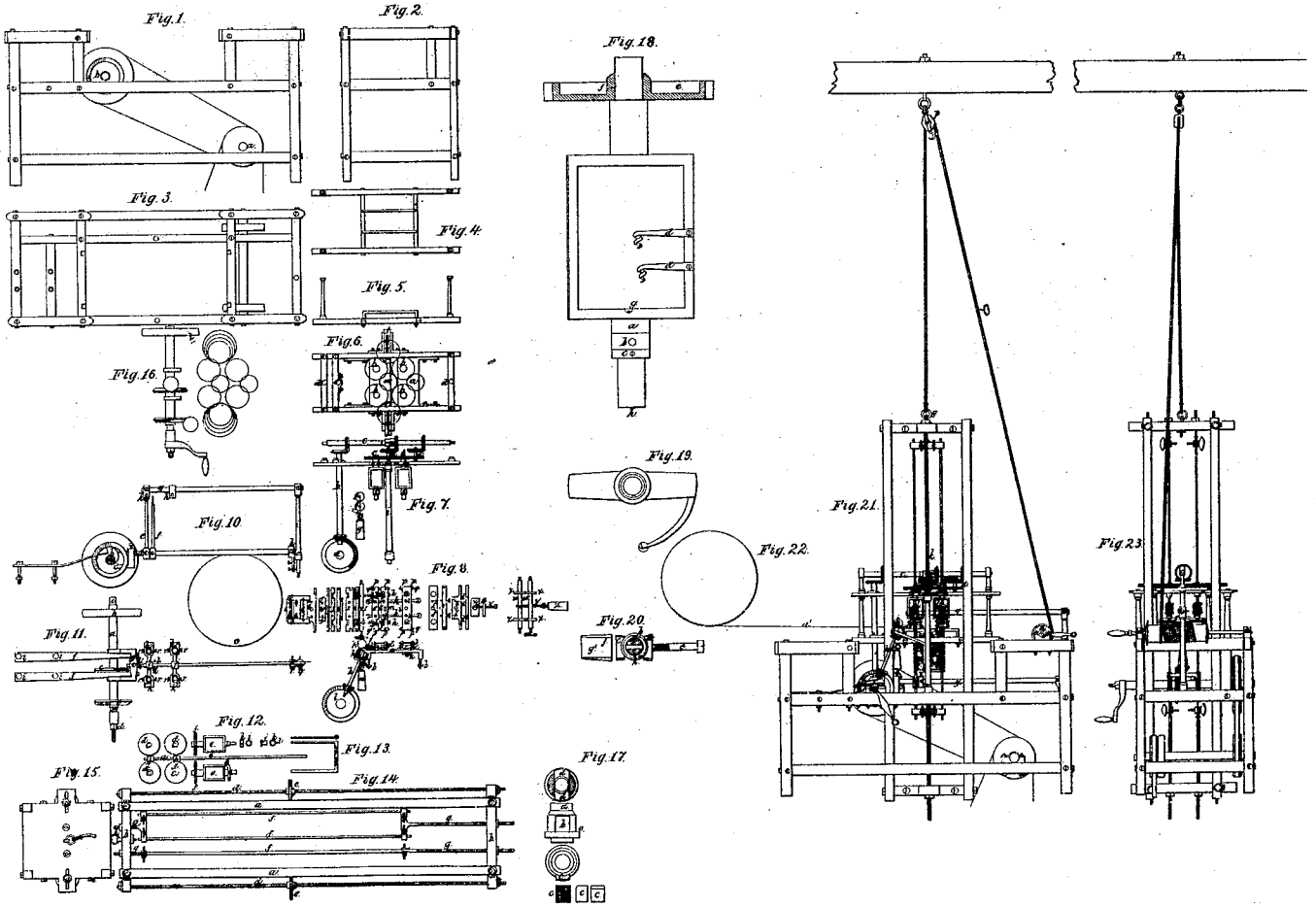
N. PETERS, PHOTO-LITHOGRAPHER, WASHINGTON, D. C.

9682X
Sheet 2, 2 Sheets
J. A. Milkinson.
Making Weavers' Reeds.
Patented Jul. 17, 1836.
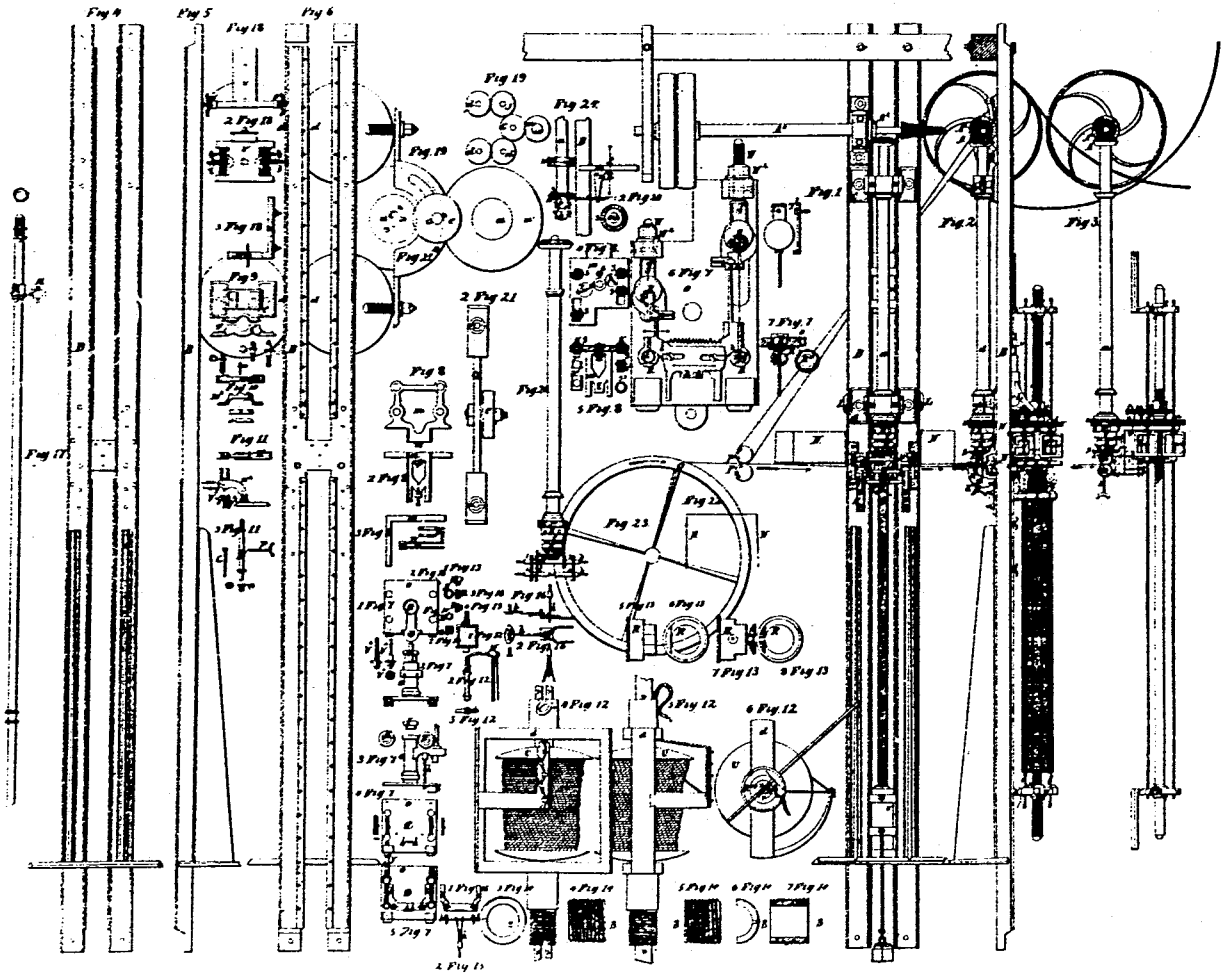
N. PETERS, PHOTO-LITHOGRAPHER, WASHINGTON, D. C.